(12) United States Patent
Sidders et al.

(10) Patent No.: US 9,573,428 B2
(45) Date of Patent: Feb. 21, 2017

(54) VALVE ASSEMBLIES AND METHODS OF INFLATING OR DEFLATING A TYRE

(71) Applicant: DANA HEAVY VEHICLE SYSTEMS GROUP, LLC, Maumee, OH (US)

(72) Inventors: Jason M. Sidders, Perrysburg, OH (US); Lloyd G. Racine, Center, ND (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 27 days.

(21) Appl. No.: 14/392,004

(22) PCT Filed: Jul. 10, 2013

(86) PCT No.: PCT/US2013/049915
§ 371 (c)(1),
(2) Date: Jan. 5, 2015

(87) PCT Pub. No.: WO2014/028142
PCT Pub. Date: Feb. 20, 2014

(65) Prior Publication Data
US 2015/0165846 A1    Jun. 18, 2015

Related U.S. Application Data

(60) Provisional application No. 61/671,380, filed on Jul. 13, 2012.

(51) Int. Cl.
*F16K 15/20* (2006.01)
*B60C 29/02* (2006.01)
*B60C 29/00* (2006.01)
*F16K 15/02* (2006.01)
(Continued)

(52) U.S. Cl.
CPC ............... *B60C 29/02* (2013.01); *B60C 23/00* (2013.01); *B60C 29/002* (2013.04); *B60C 29/005* (2013.01); *B60C 29/066* (2013.01); *F16K 15/025* (2013.01); *F16K 15/20* (2013.01); *B60C 23/003* (2013.01); *Y10T 137/0379* (2015.04); *Y10T 137/36* (2015.04); (Continued)

(58) Field of Classification Search
CPC ............. Y10T 137/3584; Y10T 137/36; Y10T 137/3646; Y10T 137/7754; Y10T 137/7771; Y10T 137/778; Y10T 137/7869
USPC ........................................................ 152/415
See application file for complete search history.

(56) References Cited

U.S. PATENT DOCUMENTS

| | | |
|---|---|---|
| 3,456,676 A | 7/1969 | Stuck |
| 3,489,166 A | 1/1970 | Williams |
| 3,724,488 A | 4/1973 | Featherstone |

(Continued)

FOREIGN PATENT DOCUMENTS

| | | | |
|---|---|---|---|
| DE | 102008062072 A1 | 6/2010 |
| EP | 0206949 A1 | 12/1986 |

(Continued)

*Primary Examiner* — R. K. Arundale
(74) *Attorney, Agent, or Firm* — Marshall & Melhorn, LLC

(57) ABSTRACT

A valve assembly including a base portion and a cap portion attached to the base portion. The valve assembly also includes a biasing member disposed between the base portion and the cap portion. The biasing member is adjacent a perforation formed in the cap portion. A shuttle assembly is in contact with the biasing member. The shuttle assembly includes a shuttle and a plug member. The plug member is attached to the shuttle.

34 Claims, 10 Drawing Sheets

(51) Int. Cl.
*B60C 29/06* (2006.01)
*B60C 23/00* (2006.01)

(52) U.S. Cl.
CPC .... *Y10T 137/3755* (2015.04); *Y10T 137/7771* (2015.04); *Y10T 137/7869* (2015.04)

(56) References Cited

U.S. PATENT DOCUMENTS

| | | | |
|---|---|---|---|
| 3,747,626 A * | 7/1973 | Valentino | F16K 15/18 |
| | | | 137/102 |
| 3,789,867 A | 2/1974 | Yabor | |
| 4,171,119 A | 10/1979 | Lamson | |
| 4,269,223 A * | 5/1981 | Carter | F16K 17/34 |
| | | | 137/460 |
| 4,480,580 A | 11/1984 | Nalence | |
| 4,641,698 A | 2/1987 | Bitonti | |
| 4,744,399 A | 5/1988 | Magnuson et al. | |
| 4,765,385 A | 8/1988 | McGeachy | |
| 4,768,574 A | 9/1988 | Probst | |
| 4,895,199 A | 1/1990 | Magnuson et al. | |
| 4,922,946 A * | 5/1990 | Boulicault | B60C 23/003 |
| | | | 137/102 |
| 5,029,604 A | 7/1991 | Spektor et al. | |
| 5,181,977 A | 1/1993 | Gneiding et al. | |
| 5,253,687 A * | 10/1993 | Beverly | B60C 23/003 |
| | | | 137/224 |
| 5,261,471 A | 11/1993 | Freigang et al. | |
| 5,293,919 A | 3/1994 | Olney et al. | |
| 5,411,051 A | 5/1995 | Olney et al. | |
| 5,413,159 A | 5/1995 | Olney et al. | |
| 5,587,698 A | 12/1996 | Genna | |
| 5,647,927 A | 7/1997 | Mason | |
| 5,713,386 A | 2/1998 | Heredia Batista et al. | |
| 6,142,168 A | 11/2000 | Sumrall | |
| 6,209,350 B1 | 4/2001 | Kimble, III | |
| 6,250,327 B1 * | 6/2001 | Freigang | B60C 23/003 |
| | | | 137/225 |
| 6,302,138 B1 | 10/2001 | Sumrall | |
| 6,374,852 B1 | 4/2002 | Olivas | |
| 6,427,714 B2 | 8/2002 | Freigang et al. | |
| 6,561,017 B1 | 5/2003 | Claussen et al. | |
| 6,604,414 B1 | 8/2003 | Claussen et al. | |
| 6,634,375 B2 | 10/2003 | Olivas et al. | |
| 6,758,088 B2 | 7/2004 | Claussen et al. | |
| 6,865,930 B1 | 3/2005 | Claussen et al. | |
| 6,868,719 B1 | 3/2005 | Claussen et al. | |
| 6,880,598 B2 | 4/2005 | Haunhorst et al. | |
| 6,943,673 B2 | 9/2005 | Skoff et al. | |
| 7,032,611 B1 | 4/2006 | Sheng | |
| 7,051,585 B2 | 5/2006 | Claussen et al. | |
| 7,079,047 B2 | 7/2006 | Boulot | |
| 7,188,638 B1 | 3/2007 | Peach | |
| 7,191,796 B1 | 3/2007 | Rehmert, Jr. | |
| 7,437,920 B2 | 10/2008 | Beverly et al. | |
| 7,686,051 B2 | 3/2010 | Medley et al. | |
| RE41,756 E | 9/2010 | Claussen et al. | |
| 8,113,234 B2 | 2/2012 | Campau | |
| 8,136,561 B2 | 3/2012 | Sandoni et al. | |
| 8,256,447 B2 | 9/2012 | Badstue et al. | |
| 8,307,868 B2 | 11/2012 | Medley et al. | |
| 8,307,869 B2 | 11/2012 | Medley et al. | |
| 8,356,620 B2 | 1/2013 | Colussi et al. | |
| 8,596,560 B2 | 12/2013 | Morgan et al. | |
| 8,844,596 B2 | 9/2014 | Medley et al. | |
| 9,308,788 B2 * | 4/2016 | Fazekas | B60C 23/003 |
| 2002/0134428 A1 * | 9/2002 | Gabelmann | B60C 29/007 |
| | | | 137/224 |
| 2008/0223457 A1 * | 9/2008 | Kobziar | A62B 9/02 |
| | | | 137/493 |
| 2009/0032619 A1 | 2/2009 | Morgan et al. | |
| 2011/0221261 A1 | 9/2011 | Eaton et al. | |
| 2011/0272618 A1 | 11/2011 | Mosler et al. | |
| 2011/0308637 A1 | 12/2011 | Tsiberidis | |
| 2011/0315235 A1 | 12/2011 | Colefax et al. | |
| 2012/0138826 A1 | 6/2012 | Morris et al. | |

FOREIGN PATENT DOCUMENTS

| | | |
|---|---|---|
| FR | 1432885 A | 3/1966 |
| FR | 2149276 A1 | 3/1973 |
| FR | 2619762 A1 | 3/1989 |
| GB | 410531 A | 5/1934 |
| GB | 646891 A | 11/1950 |
| GB | 1037494 A | 7/1966 |
| GB | 1346130 A | 2/1974 |
| GB | 2312268 A | 10/1997 |
| WO | WO9114120 A1 | 9/1991 |
| WO | WO02062595 A1 | 8/2002 |
| WO | WO2004030952 A1 | 4/2004 |
| WO | WO2010094067 A1 | 8/2010 |
| WO | WO2011028346 A1 | 3/2011 |

* cited by examiner

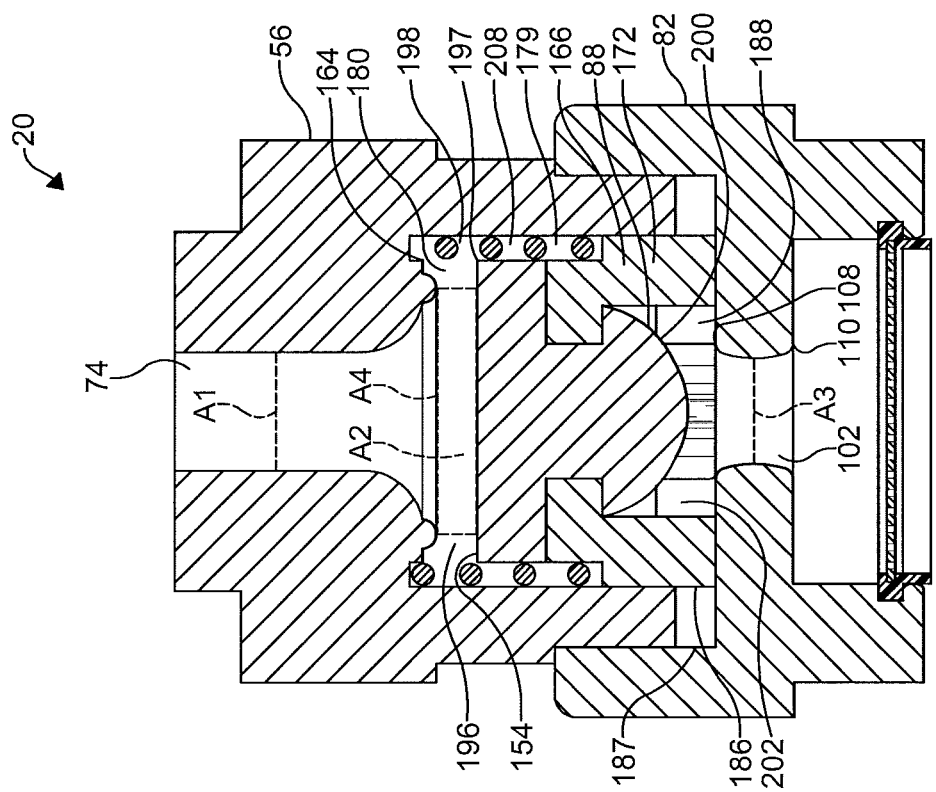
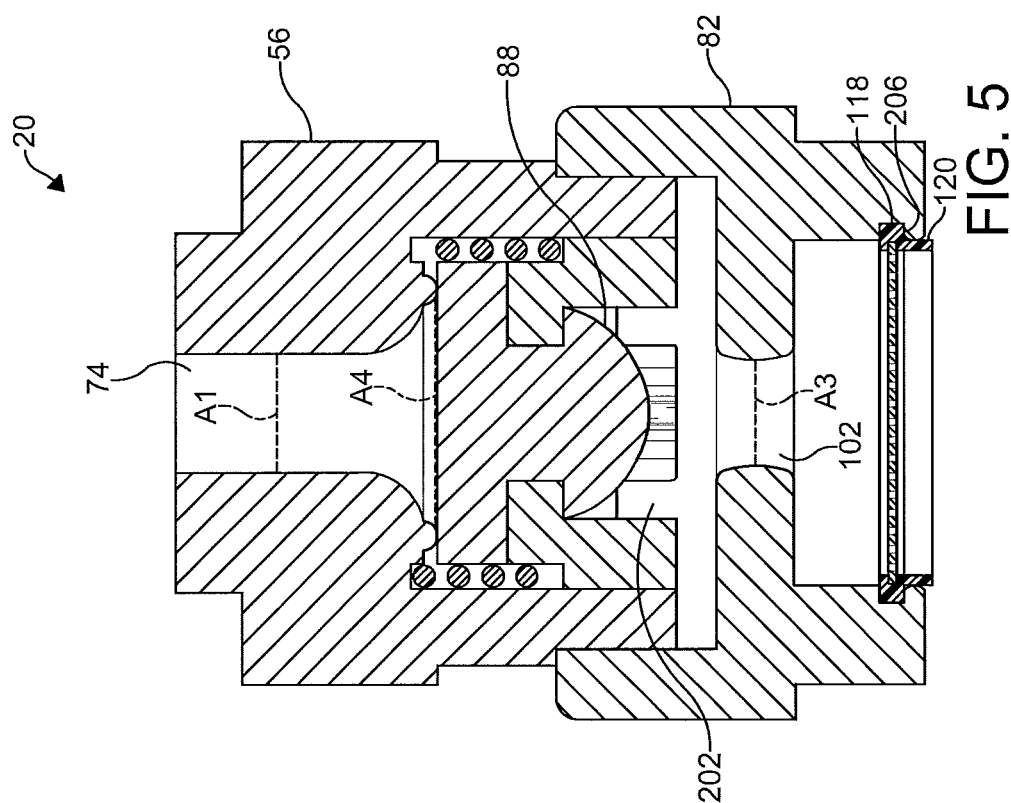

VALVE ASSEMBLIES AND METHODS OF INFLATING OR DEFLATING A TYRE

CROSS-REFERENCE TO RELATED APPLICATION

This application is claiming the benefit, under 35 U.S. C. 119(e), of the provisional application which was granted Ser. No. 61/671,380 filed on Jul. 13, 2012, the entire disclosure of which is hereby incorporated by reference.

BACKGROUND OF THE INVENTION

The invention relates to a valve assembly and, more particularly, to a control valve assembly for use with a wheel.

Valve assemblies used to restrain a pressurized fluid such as air within a sealed container are known. Valves are typically specialized for a task they are used with. Valves for use with a wheel mounted to a vehicle are an example of a specialized valve. Conventional valve assemblies are typically low in cost, reliable, and easily replaced. Despite such benefits, the conventional valve assembly is not without its disadvantages.

The conventional wheel valve includes a resilient sealing member and a valve seat. Typically, the resilient sealing member is urged against the valve seat by a biasing member. A force applied by the biasing member is relatively constant with regards to a temperature range the conventional wheel valve may be used in. As a non-limiting example, the temperature range may be from about 0° Fahrenheit to about 120° Fahrenheit. The elasticity of the resilient sealing member, however, may vary greatly with respect to the temperature range. As a result, the force applied by the biasing member may not be large enough to seal the conventional valve assembly at low temperatures and increasing elasticity of the resilient sealing member at high temperatures may result in leakage or failure of the valve assembly.

The conventional valve assembly may also be limited to a lower operating pressure range. As a non-limiting example, the operating pressure range may be up to about 100 pounds per square inch (psi). Exposing the conventional valve assembly to pressures greater than the aforementioned pressure range may result in a leakage or a failure of the conventional valve assembly.

The valve assembly may also be a specialized for use with a particular wheel, tire inflation system or application. For example, certain tire inflation systems are utilized to manually and/or automatically adjust a pressure within the wheel. Typically, the valve assembly used with the tire inflation system includes a diaphragm urged towards a valve seat by a biasing member. Such valve assemblies tend to be bulky, expensive, and visible. During an inflation cycle or a deflation cycle, the tire inflation system applies pressure to an air conduit in fluid communication with the valve assembly to unseat the diaphragm of the valve assembly, which allows the tire inflation system to adjust the pressure within the wheel. To reseat the diaphragm of the valve assembly, the tire inflation system must rapidly drop the pressure within the air conduit by at least a specified amount. However, backpressure within the air conduit resists rapid depressurization, causing the diaphragm to operate slowly at higher pressures. Backpressure within the air conduit is exacerbated by long lengths of the air conduit and higher pressures. As a non-limiting example, the higher pressures may be greater than 100 psi. As a result of backpressure, the tire inflation system must rapidly drop the pressure within the air conduit by an increased amount, which increases a duration of the inflation cycle or the deflation cycle. Slower operation of the wheel valve results in delayed and inaccurate operation of the tire inflation system at higher pressures.

It would be advantageous to develop a valve assembly that is inexpensive, may be used with a wheel, the valve assembly operable in an increased temperature range, the valve assembly operable at higher pressures, and the valve assembly able to be quickly closed with a minimal drop in pressure by a tire inflation system during an inflation cycle or deflation cycle.

BRIEF SUMMARY OF THE INVENTION

A valve assembly is provided. In an embodiment, the valve assembly comprises a base portion. A cap portion is attached to the base portion. A biasing member is disposed between the base portion and the cap portion and is adjacent a perforation formed in the cap portion. The valve assembly also comprises a shuttle assembly in contact with the biasing member. The shuttle assembly comprises a shuttle and a plug member. The plug member is attached to the shuttle.

In another embodiment, the valve assembly comprises a base portion. A cap portion is attached to the base portion. A biasing member is disposed between the base portion and the cap portion and is adjacent a perforation formed in the cap portion. A shuttle assembly is in contact with the biasing member. The shuttle assembly comprises a plug member. The plug member is in sealing contact with a ridge formed about the perforation formed in the cap portion.

A wheel assembly is provided. The wheel assembly comprises a tire and a wheel rim attached to the tire to form a wheel. A valve assembly is positioned within the wheel.

A method of inflating or deflating a wheel is provided. In an embodiment, the method of inflating or deflating a wheel comprises providing a valve assembly. The valve assembly comprises a shuttle assembly and a biasing member that is disposed between a base portion and a cap portion. A fluid is directed through the valve assembly via a perforation in the cap portion, about the shuttle assembly and biasing member and via a perforation in the base portion. The method also comprises urging the shuttle assembly toward the base portion or the cap portion so as to open or close the valve assembly.

A method of placing a valve assembly in a closed position is also provided. In an embodiment, the method of closing a valve assembly comprises providing the valve assembly. The valve assembly comprises a shuttle assembly and a biasing member that are disposed between a base portion and a cap portion. A fluid is provided in the valve assembly which is at first flow rate in the base portion, at a second flow rate adjacent the shuttle assembly and at a third flow rate in the cap portion. The method also comprises urging the shuttle assembly toward the cap portion so as to close the valve.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which:

FIG. 5 depicts a sectional view of the valve assembly of FIG. 3 along line 5-5 under certain conditions;

FIG. 5A depicts a sectional view of the valve assembly of FIG. 3 along line 5A-5A under certain conditions;

DETAILED DESCRIPTION OF THE INVENTION

Figure 1:
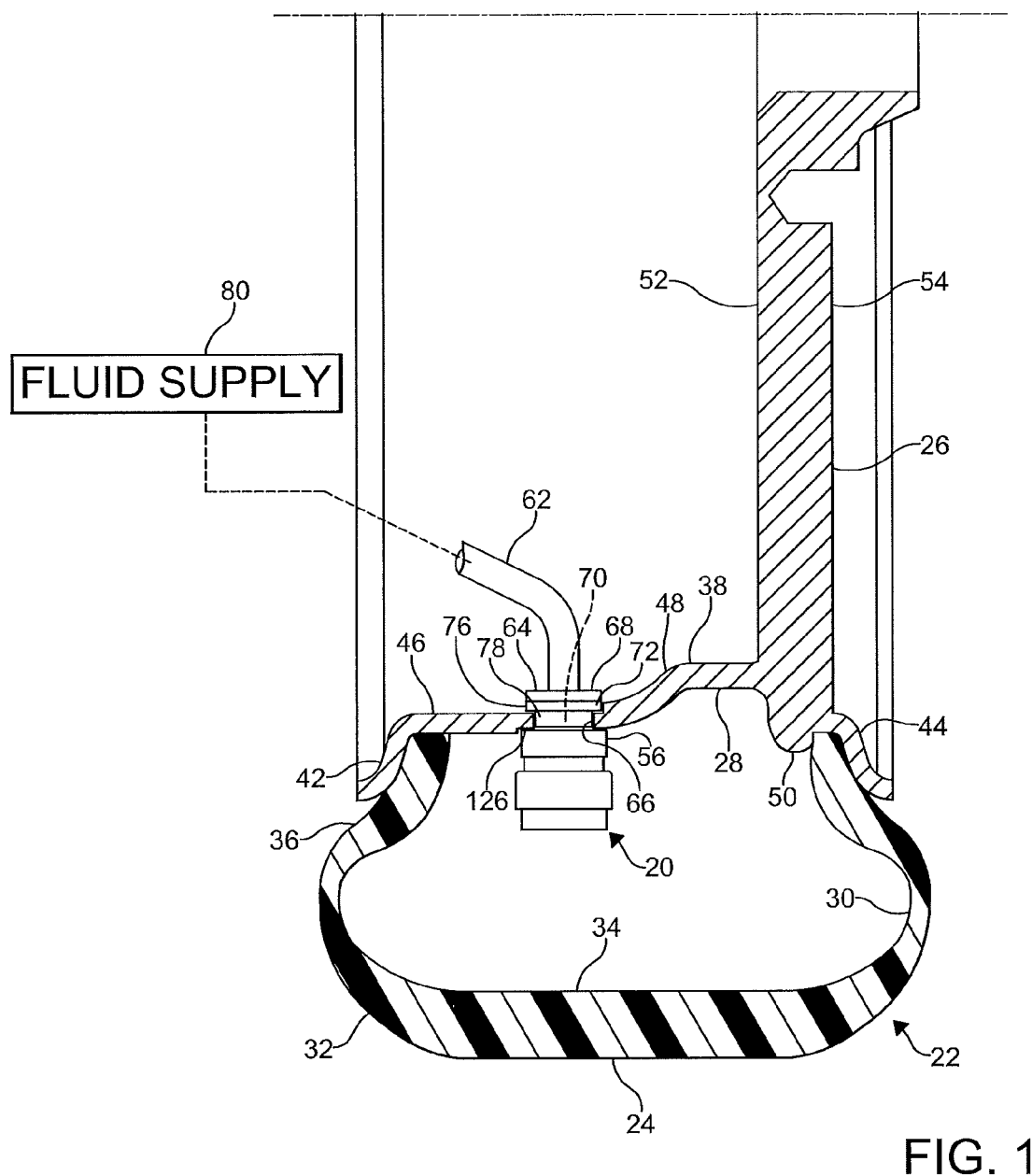
FIG. 1 depicts a sectional view of an embodiment of a wheel assembly in accordance with the invention.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Various embodiments of a valve assembly 20 are described herein. The embodiments of the valve assembly 20 described herein may have applications to commercial and off-highway vehicles. Also, it would be understood by one of ordinary skill in the art that these embodiments could have industrial, locomotive, military and aerospace applications.

The valve assembly 20 is preferably utilized with a wheel assembly 22, 22A. When utilizing the valve assembly 20 with a wheel assembly, the wheel assembly may have advantages over known wheel assemblies when inflating, deflating and/or operating the assembly. However, it should be appreciated that the valve assembly may be used with other types of assemblies. For example, the valve assembly 20 may be utilized in a pneumatic assembly (not depicted).

Figure 2:
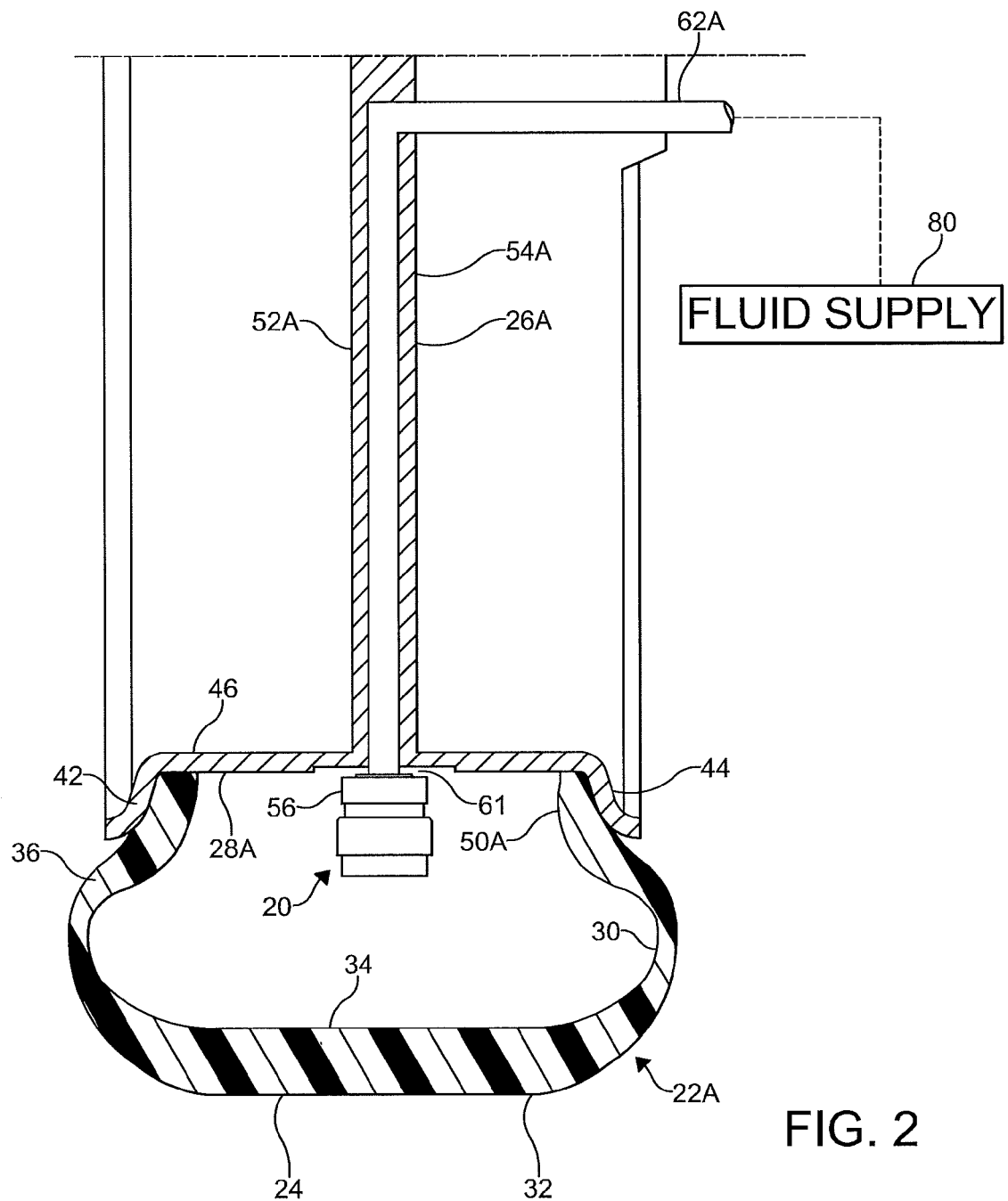
FIG. 2 depicts a sectional view of another embodiment of a wheel assembly in accordance with the invention.
Figure 3:
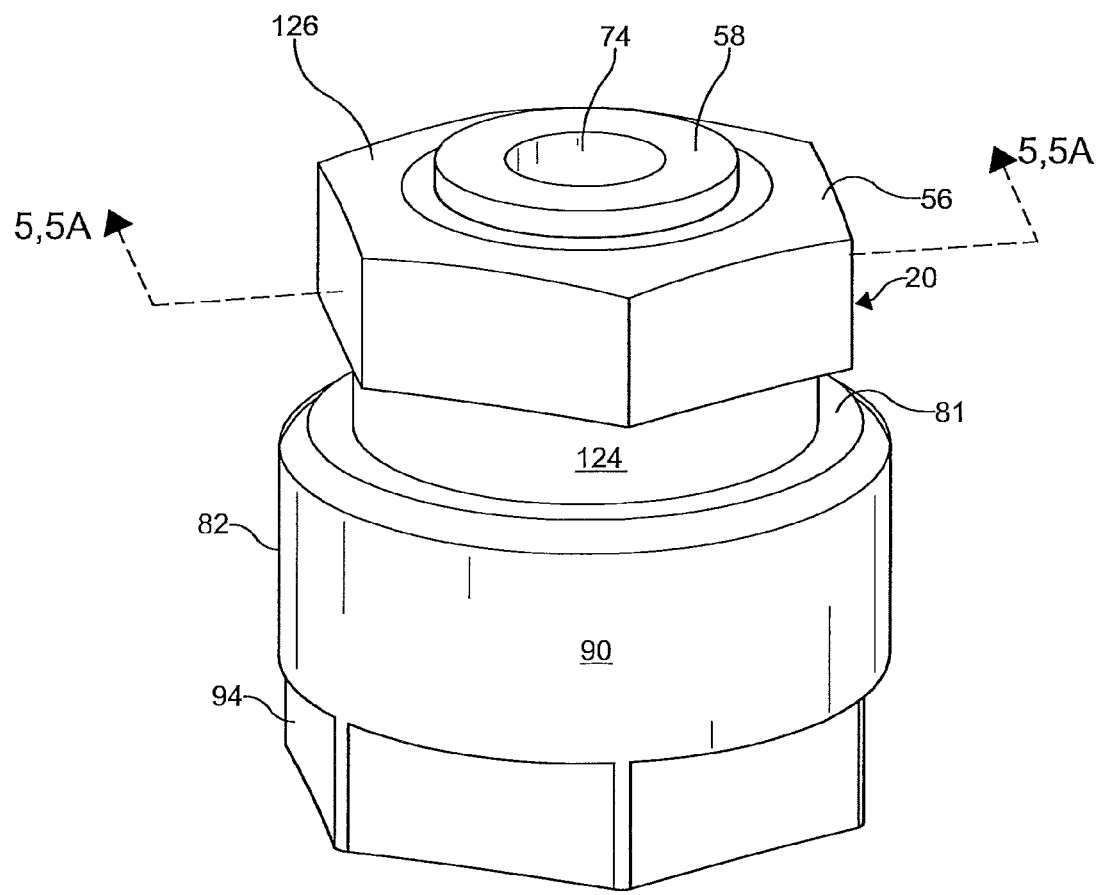
FIG. 3 depicts a perspective view of an embodiment of the valve assembly in accordance with the invention which is suitable for use in the wheel assemblies of FIG. 1 and FIG. 2.

Embodiments of wheel assemblies 22, 22A are illustrated in FIGS. 1 and 2. As illustrated, the wheel assembly 22, 22A comprises a tire 24 and a wheel rim 26, 26A. Preferably, the tire 24 is sealingly attached to an outer surface 28, 28A of the wheel rim 26, 26A.

The tire 24 is conventional in the art. The tire 24 comprises an inner surface 30 and an outer surface 32. A portion 34 of the inner surface 30 faces the wheel rim 26, 26A. When the tire 24 is attached to the wheel rim 26, 26A, the outer surface 32 forms an outer surface of a wheel 36.

The wheel rim 26, 26A comprises an inner surface 38 and the outer surface 28, 28A. In certain embodiments, the wheel rim 26, 26A also comprises a first flange portion 42 and a second flange portion 44. A first portion 46 may be attached to and extend axially from the first flange portion 42 on an end. On an opposite end, the first portion 46 is attached to a second portion 48 which extends axially and radially therefrom. The second portion 48 may also be attached to a rib portion 50. When provided, the rib portion 50 is attached to the second flange portion 44. Preferably, the rib portion 50 is of a thickness which is greater than the other portions of the wheel rim 26.

Attaching the tire 24 to the wheel rim 26, 26A forms the wheel 36. The wheel 36 houses a fluid such as, for example, air. It should be appreciated that the wheel 36 may house alternative fluids. Preferably, the fluid is pressurized. Within the wheel 36 the fluid (or pressurized fluid) may be at a pressure from about 2 to 180 psi. Preferably, the fluid is at a pressure from about 5 to 180 psi.

The valve assembly 20 is in fluid communication with the wheel 36. Preferably, the valve assembly 20 is provided within the wheel 36.

In an embodiment like the one illustrated in FIG. 1, the valve assembly 20 is attached to the wheel rim 26. In this embodiment, the valve assembly 20 is attached to the outer surface 28 of the wheel rim 26. However, it should be appreciated that the valve assembly 20 is not limited to being attached to the outer surface 28 of the wheel rim 26 as is illustrated in FIG. 1 as, in other embodiments, the valve assembly 20 may be attached to the inner surface 38, an inboard surface 52, 52A or an outboard surface 54, 54A of the wheel rim 26, 26A.

In the embodiment illustrated in FIG. 1, the valve assembly 20 is attached to the outer surface 28 of the wheel rim 26 such that an annular portion 58 and a portion of an upper wall portion 126, 126A of the valve assembly 20 abuts the outer surface 28 of the wheel rim 26. In other embodiments like the one illustrated in FIGS. 9A and 10A, the valve assembly 20 includes an outer groove 40 which is disposed about the annular portion 58. In an embodiment, the outer groove 40 is ring-shaped. Preferably, a first sealing member (not depicted) is provided in the outer groove 40 and about the annular portion 58 to provide a seal between the valve assembly 20 and the outer surface 28, 28A of the wheel rim 26 which prevents fluid from escaping from the wheel 22. The first sealing member may have an annular shape and be formed of rubber or another suitable material. In an embodiment, the first sealing member is an O-ring.

In other embodiments like the one shown in FIG. 2, an inflation system conduit 62A extends into the wheel 36 so that the valve assembly 20 is separated from the outer surface 28A of the wheel rim 26A by a space 63. In this embodiment, the inflation system conduit 62A is provided through the outboard surface 54A of the wheel rim 26A, extends axially, turns and extends radially through the outer surface 28A of the wheel rim 26A. The inflation system conduit 62A is sealingly engaged with the wheel rim 26A.

Referring back to FIG. 1, in certain embodiments, the inflation system conduit 62 is in fluid communication with the valve assembly 20 via a valve mount 64. In these embodiments, the inflation system conduit 62 is sealingly engaged with the valve mount 64. The valve mount 64 is disposed through a perforation 66 formed in the wheel rim 26. The valve mount 64 may extend from the inner surface 38 of the wheel rim 26 through to the outer surface 28, 28A thereof.

The valve mount 64 comprises a flange portion 68, connecting portion 70 and sealing member 72. The flange portion 68 abuts the sealing member 72 and is attached to an end of the connecting portion 70. The flange portion 68, connecting portion 70 and sealing member 72 may be concentric. The connecting portion 70 includes threads formed on an outer surface (not depicted) thereof for engaging threads provided in a perforation 74, which hereinafter may also be referred to as the "cap perforation," formed in a cap portion 56. The sealing member 72 is provided about a portion of the connecting portion 70 and is sealingly disposed within the perforation 66 formed in the wheel rim 26. The sealing member 72 comprises an annular portion 76 attached to a body portion 78. The sealing member 72 is preferably elastomeric and may be formed of rubber or another suitable material.

The inflation system conduit 62, 62A may be in fluid communication with a fluid supply 80 and is utilized to communicate fluid from the fluid supply 80 or the wheel 36. The fluid supply 80 provides pressurized fluid when it is desired to inflate the wheel 36. The pressurized fluid provided by the fluid supply 80 is at a pressure that is greater than the pressure of the fluid in the wheel 36. The pressurized fluid provided by the fluid supply 80 may be at a pressure of 180 psi or more. The fluid supply 80 and the inflation system conduit 62, 62A may be provided as a portion of a tire inflation system.

Referring now to FIGS. 3-12, embodiments of the valve assembly 20 will be described. As illustrated in FIG. 5, under certain conditions, the valve assembly 20 may be in a closed position or placed in the closed position. Also, as illustrated in FIG. 5A, under certain conditions, the valve assembly 20 may be in an open position or placed in the open position.

Preferably, the valve assembly 20 comprises a housing 81. The housing 81 is preferably metallic. However, it should be understood that the housing may be formed utilizing other materials. The housing may be formed in a unitary manner or by joining a plurality of components. Preferably, the housing 81 comprises a base portion 82 and the cap portion 56. The valve assembly 20 also comprises a biasing member 86 and a shuttle assembly 88.

Figure 7:
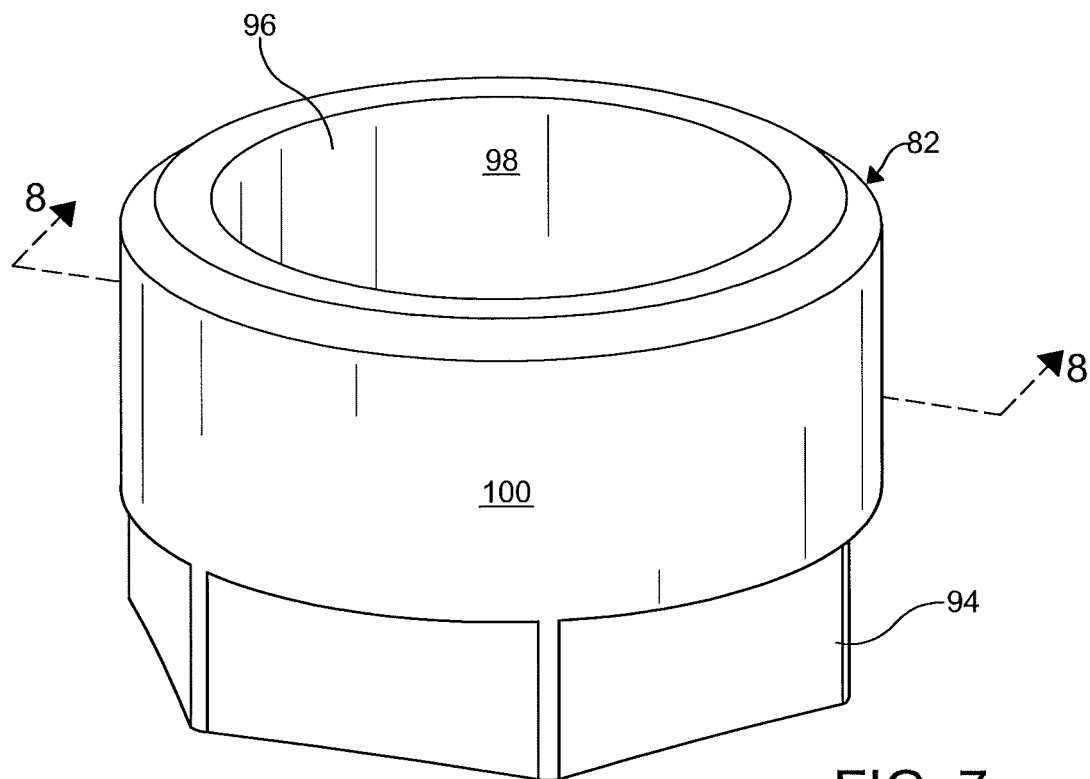
FIG. 7 depicts a perspective view of a base portion of the valve assembly of FIG. 3.
Figure 8:
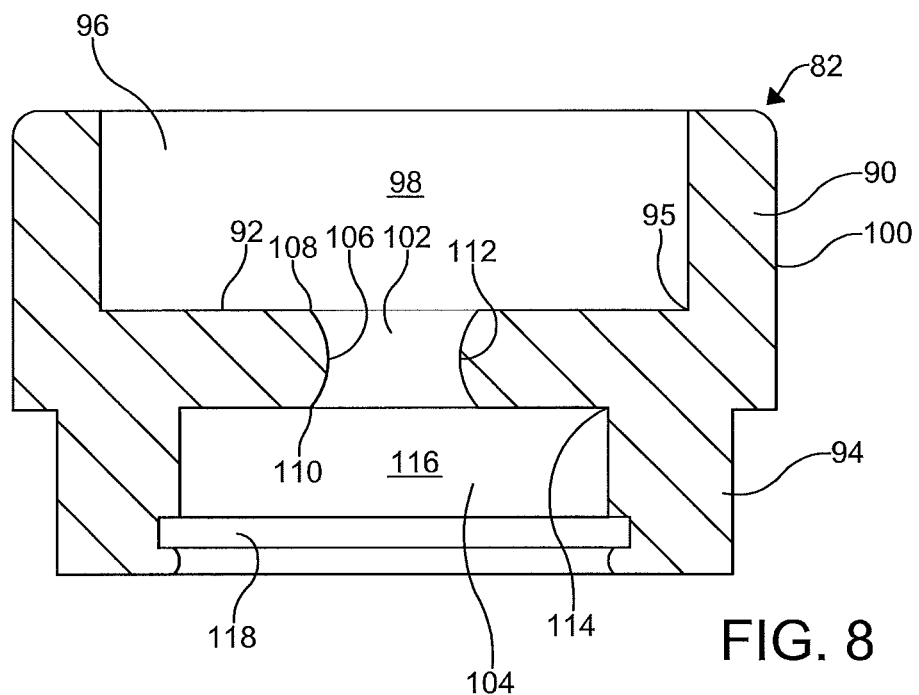
FIG. 8 depicts a sectional view of the base portion of FIG. 7 along line 8-8.

The base portion 82 is a generally annular member into which the cap portion 56, biasing member 86 and shuttle assembly 88 are partially disposed. As best illustrated in FIGS. 7 and 8, the base portion 82 comprises an outer wall portion 90, a lower wall portion 92, and a stem portion 94. Preferably, the base portion 82 is unitarily formed by casting a metal. However, it should be understood that the base portion 82 may be formed using other materials and processes. It should also be understood that the base portion 82 may be formed by joining a plurality of components.

The outer wall portion 90 is of a generally cylindrical shape. The outer wall portion 90 is attached to the lower wall portion 92 at a first end 95 thereof and extends away therefrom. The outer wall portion 90 and the lower wall portion 92 define a base cavity 96. Preferably, an inner face 98 of the outer wall portion 90 includes a thread portion formed thereon for engaging a thread portion formed on the cap portion 56. An outer face 100 of the outer wall portion 90 may be knurled. In other embodiments (not depicted), the outer face of the outer wall portion may include a thread portion formed thereon for engaging a thread formed in a component the valve assembly is coupled to.

The lower wall portion 92 is attached to the outer wall portion 90 on a side and the stem portion 94 on an opposite side thereof. The lower wall portion 92 is in a perpendicular relationship with both the outer wall portion 90 and the stem portion 94. The lower wall portion 92 defines a perforation 102 formed in the base portion 82, which hereinafter may also be referred to as the "base perforation." The base perforation 102 extends through the lower wall portion 92 and allows the base cavity 96 to communicate with a stem cavity 104.

The base perforation 102 is shaped to militate against pressure losses that occur as fluid flows through an orifice constriction and to set a relative flow rate of the fluid that enters the base cavity 96 or the stem cavity 104. The base perforation 102 has a diameter 106 which is of a length that varies radially and may be of a generally hourglass shape. Alternately, the base perforation may be of another shape that militates against pressure losses that occur as a fluid flows through an orifice constriction. In an embodiment, the diameter 106 of the base perforation 102 varies from a first end 108 to a second end 110. In this embodiment, it is preferred that the diameter 106 of the base perforation 102 gradually decreases in length from the first end 108 adjacent the base cavity 96 to a reduced diameter in a center portion 112 of the lower wall portion 92 and then gradually increases in length along a remaining portion of the lower wall portion 92 to the second end 110 adjacent the stem cavity 104. In other embodiments (not depicted), the varying diameter of the base perforation may be defined by a pair of circular fillets formed in the lower wall portion or by other conic sections.

The stem portion 94 is of a generally cylindrical shape. The stem portion 94 is attached to the lower wall portion 92 at a first end 114 thereof and extends away therefrom. The lower wall portion 92 and the stem portion 94 define the stem cavity 104. Preferably, an inner face 116 of the stem portion 94 includes a groove 118 formed therein for engaging a filter 120 (removed from FIGS. 7 and 8 for the ease of illustration). As illustrated in FIGS. 5 and 5A, the filter 120 is at least partially disposed in the stem cavity. In other embodiments (not depicted), the inner face may include a thread portion formed thereon for engaging a thread portion formed on the filter or another portion of the assembly. In still other embodiments (not depicted), a thread portion may be formed on an outer face of the stem portion for engaging a thread portion formed on the filter or another portion of the assembly.

Figure 9:
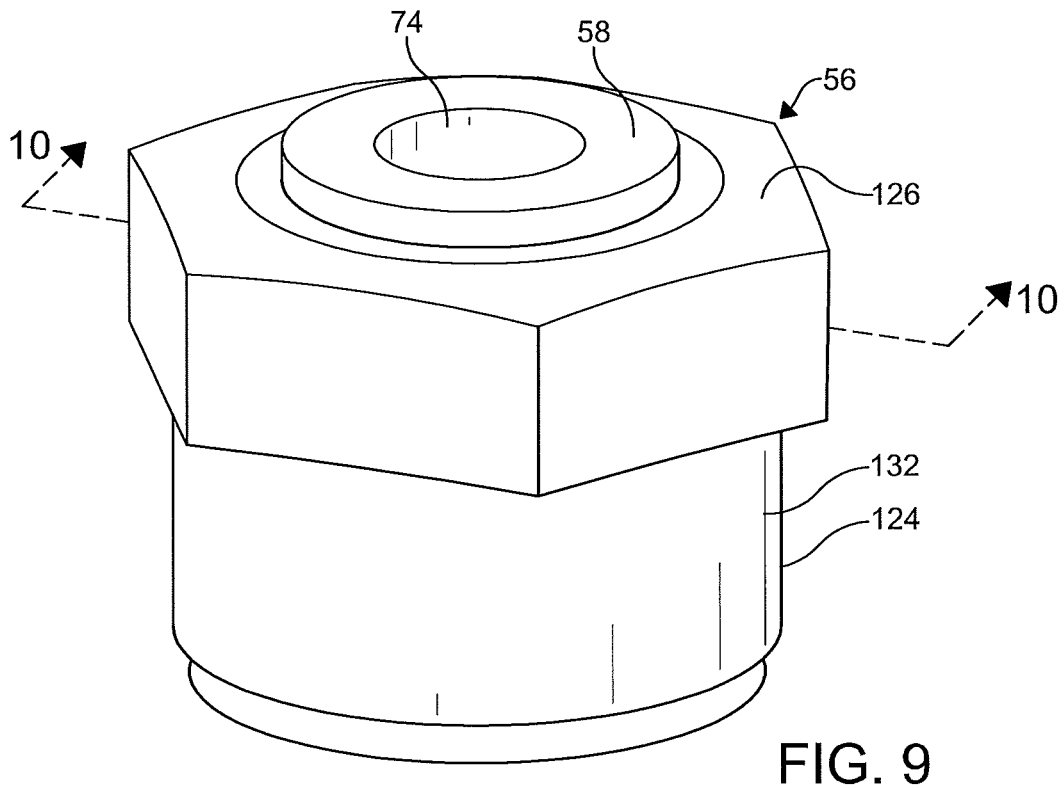
FIG. 9 depicts a perspective view of an embodiment of a cap portion of the valve assembly of FIG. 3.
Figure 10:
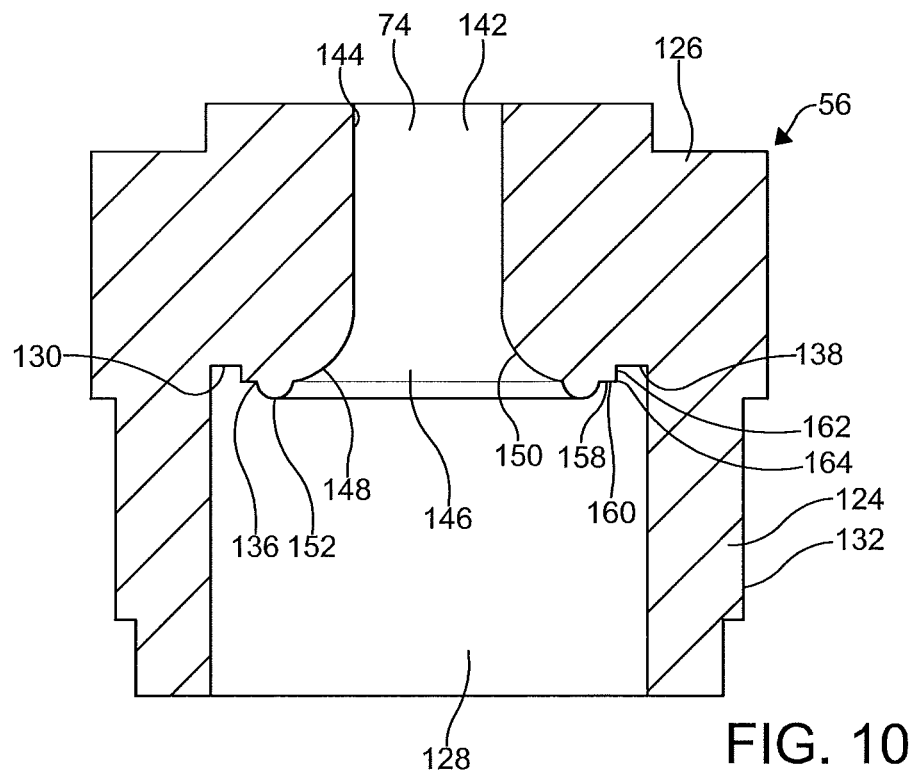
FIG. 10 depicts a sectional view of the cap portion of FIG. 9 along line 10-10.

The cap portion 56 is attached to the base portion 82. The cap portion 56 is an annular member into which the shuttle assembly 88 and the biasing member 86 are partially disposed. Referring now to FIGS. 9 and 10, the cap portion 56 comprises an outer wall portion 124 and the upper wall portion 126. The outer wall portion 124 and the upper wall portion 126 define a cap cavity 128. Preferably, the cap portion 56 is unitarily formed by casting a metal. However, it should be understood that the cap portion 56 may be formed using other materials and processes. It should also be understood that the cap portion 56 may be formed by joining a plurality of components.

The outer wall portion 124 is of a substantially cylindrical shape. The outer wall portion 124 is attached to the upper wall portion 126 at a first end 130 thereof and extends away therefrom. An outer face 132 of the outer wall portion 124 may be of a stepped configuration and include a thread formed thereon for engaging the thread formed on the inner face 98 of the base portion 82. At least a portion of the outer face 132 may be shaped to facilitate turning the cap portion 56 during assembly or disassembly of the valve assembly 20.

The upper wall portion 126 is substantially ring-shaped. The upper wall portion 126 is attached to the outer wall portion 124 at an outer edge portion thereof. The outer wall portion 124 and an inner face 136 of the upper wall portion 126 define a groove 138. The groove 138 is an annular recess which receives a second member end 140 of the biasing member 86.

The upper wall portion 126 defines the cap perforation 74. The cap perforation 74 is formed through the upper wall portion 126 and is aligned with the base perforation 102. The inflation system conduit 62, 62A is in fluid communication with the valve assembly 20 via the cap perforation 74.

Figure 9A:
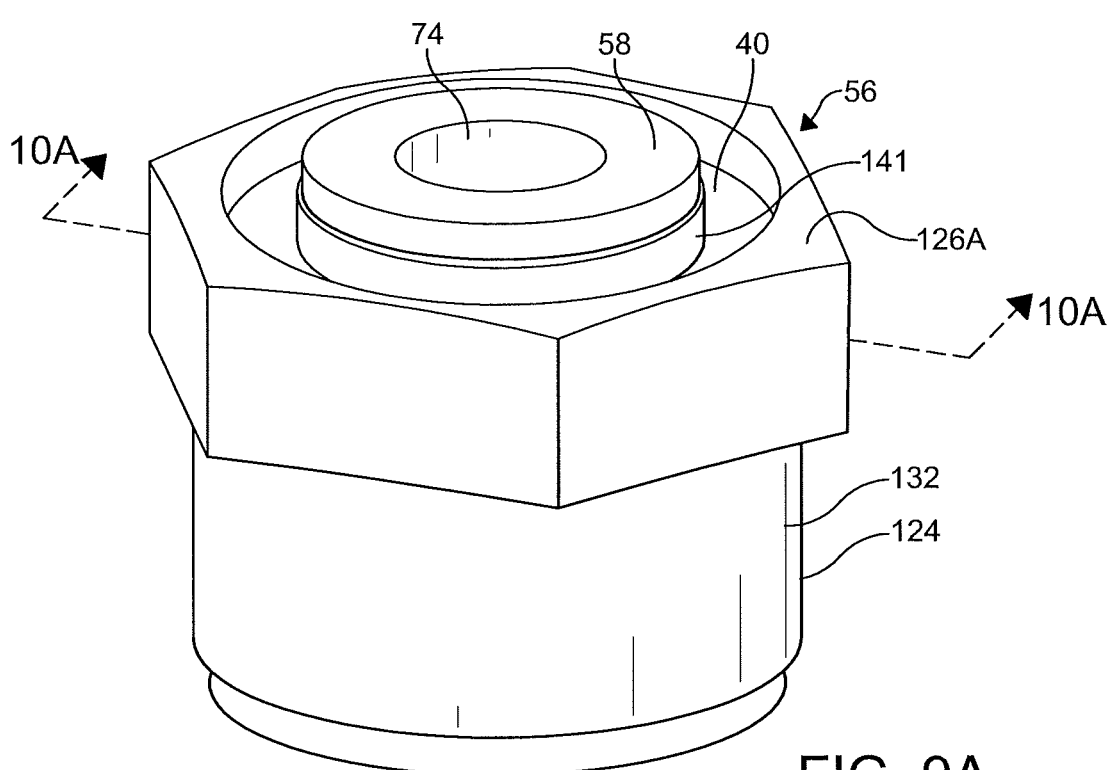
FIG. 9A depicts a perspective view of another embodiment of a cap portion suitable for use with the valve assembly of FIG. 3.
Figure 10A:
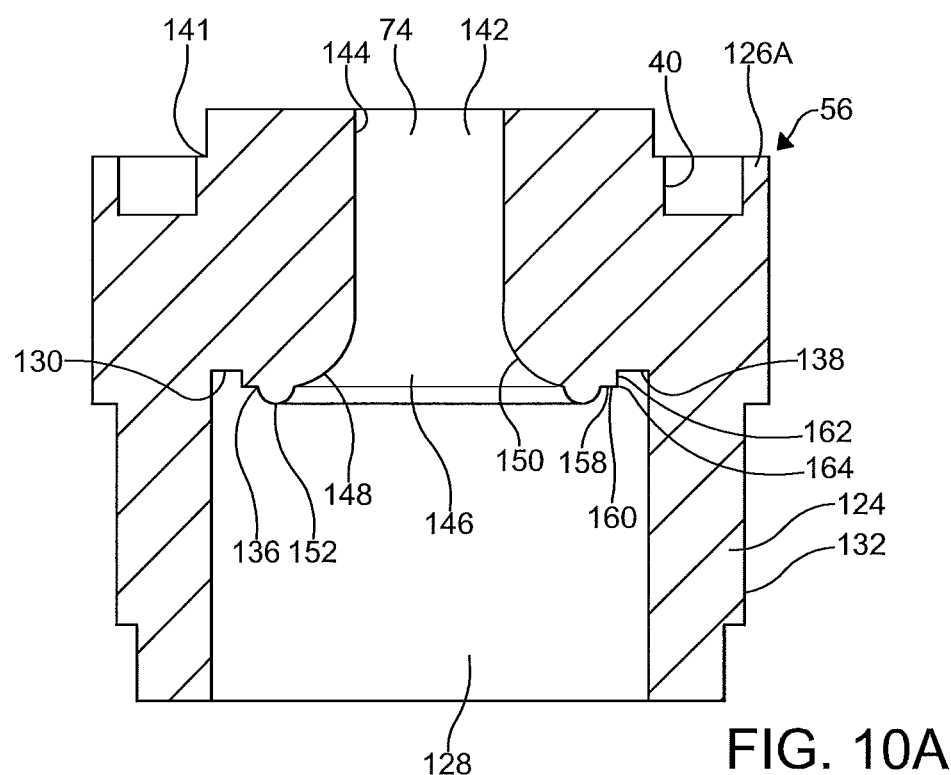
FIG. 10A depicts a sectional view of the cap portion of FIG. 9A along line 10A-10A.

As illustrated in FIGS. 9A and 10A, the outer groove 40 may be formed in the upper wall portion 126A. The outer groove 40 may abut and be disposed about the annular portion 58. In other embodiments, a portion 141 of the upper wall portion 126A separates the outer groove 40 from the annular member 58.

The cap perforation 74 is shaped to militate against pressure losses that occur as a fluid flows through an orifice constriction and to set a relative flow rate for the fluid as it is directed through the valve assembly 20. As shown in FIG. 10, the cap perforation 74 has a first portion 142 which has a diameter 144 of a length that is substantially constant and a second portion 146 which has a diameter 148 of a length which varies. The first portion 142 is preferably of a cylindrical shape. The second portion 146 is defined by a rounded portion 150 of the upper wall portion 126 and gradually increases in diameter to a ridge 152 included on the inner face 136. The diameter 148 of the second portion 146 is greater than the diameter 144 of the first portion 142. Alternately, the cap perforation may be of or defined by other shapes that militate against pressure losses that occur as a fluid flows through an orifice constriction. For example, in an embodiment (not depicted), the second portion may be defined by a pair of circular fillets formed in the upper wall portion and the inner face. Additionally, in other embodiments (not depicted), the first portion and/or second portion may be defined by other conic sections. Furthermore, it should be understood that the upper wall portion may include at least one additional feature to facilitate applying a pressurized fluid to the cap cavity. In certain embodiments (not depicted), the at least one additional feature may be one of a hollow cylindrical protuberance extending from the upper wall portion, a thread formed in the upper wall portion, or a fitting adapted to receive a coupling.

The ridge 152 is formed about the cap perforation 74 on the inner face 136. The ridge 152 is shaped to militate against pressure losses that occur as a fluid flows through an orifice constriction. When the valve assembly 20 is in the closed position, a sealing surface 154 of a plug member 156 abuts and sealingly contacts the ridge 152. The ridge 152 is an annular body and has a hemispherical cross-section. However, it should be appreciated that the cross-section of the ridge may be of other shapes.

The inner face 136 comprises a first portion 158. The first portion 158 is an annular portion and separates the ridge 152 from the groove 138. The first portion 158 includes a first surface 160 which is attached to the ridge 152 and a second surface 162 which defines a portion of the groove 138. Preferably, the first surface 158 and second surface 160 are attached to each other to provide the first portion 158 with a sharply defined edge portion 164.

Referring back to FIG. 4, the shuttle assembly 88 comprises a shuttle 166 and the plug member 156. The plug member 156 is engaged with the shuttle 166 via an aperture 168 formed in the shuttle 166. The shuttle assembly 88 is partially disposed in the base cavity 96. The shuttle assembly 88 is biased towards the lower wall portion 92 of the base portion 82 by the biasing member 86.

Figure 11:
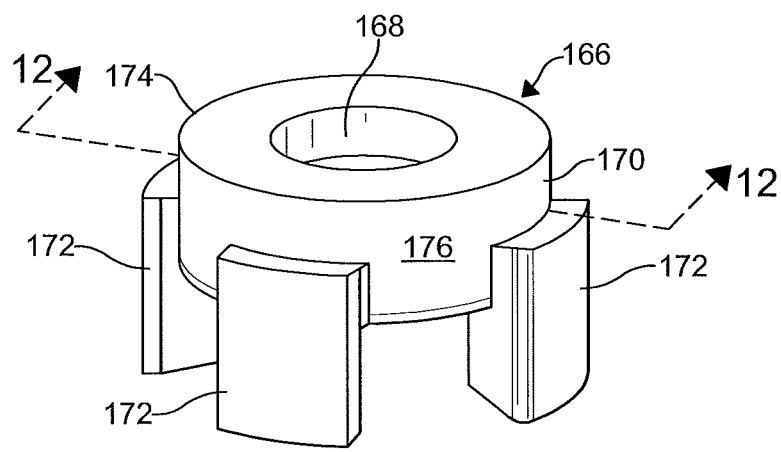
FIG. 11 depicts a perspective view of a portion of the valve assembly of FIG. 3.
Figure 12:
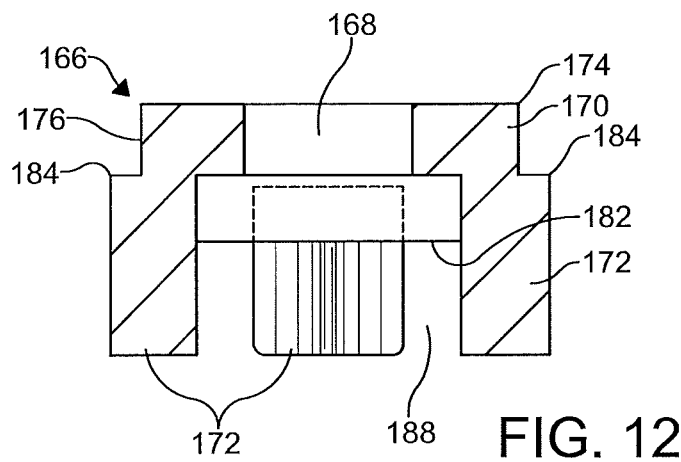
FIG. 12 depicts a sectional view of the portion of FIG. 11 along line 12-12.

Referring now to FIGS. 11 and 12, the shuttle 166 comprises a main portion 170 and a plurality of shuttle supports 172. Preferably, the shuttle 166 is unitarily formed by injection molding a thermoplastic, preferably polyoxymethylene, such as that sold by E.I. duPont de Nemours and Company under the trademark Delrin®. However, it should be appreciated that the shuttle 166 may be formed using other materials and processes. For example, the shuttle may be formed by machining a metal. It should also be appreciated that the shuttle may be formed by joining a plurality of components.

The main portion 170 is a ring-shaped body. However, it should be appreciated that other shapes may be used. The main portion 170 comprises an outer edge 174 that is sharply defined. A definition of the outer edge 174 may be defined by the process used to form the shuttle 166. The outer edge 174 is shaped to increase a drag force applied to the shuttle assembly 88 by a fluid flowing adjacent thereto. The main portion 170 defines the aperture 168. An outer face 176 of the main portion 170 has a diameter smaller than an inner diameter 178 of the outer wall portion 124 adjacent thereto. A space between the outer face 176 of the main portion 170 and the outer wall portion 124 forms a portion of a fluid passage 180 which exists when the valve assembly 20 is in the open position. A first side 182 of the main portion 170 faces the lower wall portion 92.

The shuttle supports 172 are equally spaced apart and attached to the first side 182 and the outer face 176 of the main portion 170. Preferably, each shuttle support 172 is a generally wedge-shaped body. However, it should be appreciated that the shuttle supports may be shaped differently or be of another shape. As shown in FIG. 12, each of the shuttle supports 172 comprises an upper edge 156 that is sharply defined. A definition of the upper edges 156 may be defined by the process used to form the shuttle supports 172. The upper edges 156 are shaped to increase a drag force to the shuttle assembly 88 by a fluid flowing adjacent thereto.

The shuttle supports 172 define an outer diameter 186 of the shuttle 42. As shown in FIG. 5A, the outer diameter 186 of the shuttle 166 is smaller than a diameter 187 of the inner face 98 of the base portion 82. Each of the shuttle supports 172 abuts the lower wall portion 92 of the base portion 82 when the valve assembly 20 is in the open position. When the valve assembly 20 is in the open position, the spaces 188 between successive shuttle supports 172 form a portion of the fluid passage 180.

The plug member 156 is an annular body formed from a resilient material. The plug member 156 comprises the sealing surface 154 and a bulbous base 190. A retaining groove 192 is provided between the sealing surface 154 and the bulbous base 190. As shown best in FIG. 4, the plug member 156 may be unitarily formed. However, it should be appreciated that the plug member may be formed from a plurality of components.

The sealing surface 154 is formed in a distal end of the plug member 156 opposite the bulbous base 190. The sealing surface 154 is of a circular shape and is preferably flat. However, it is understood that the sealing surface 154 may be of another shape. The sealing surface 154 is sharply defined by an outer edge 194. The outer edge 194 is shaped to decrease a flow rate of the fluid flowing adjacent thereto when the valve assembly 20 is in the open position. The outer edge 194 may be defined by the process used to form the sealing surface 154.

The sealing surface 154 is disposed adjacent the cap perforation 74 and abuts the ridge 152 so as to be in sealing contact therewith when the valve assembly 20 is in the closed position as is shown in FIG. 5. When the valve assembly 20 is in the open position, a space 196 separates the ridge 152 and the sealing surface 154 as is shown in FIG. 5A. Also, when the valve assembly 20 is in the open position, the edge portion 164 of the first portion 158 and an adjacent portion 197 of the sealing surface 154 provide a portion 198 within the valve assembly 20 where the flow rate of the fluid is reduced when compared with other portions of the valve assembly 20 such as, for example, adjacent the ends 108, 110 of the base perforation 102 or adjacent the cap perforation 74 and ridge 152.

Referring back to FIG. 4, the bulbous base 190 preferably has a generally hemispherical shape. However, it should be appreciated that the bulbous base may be of another shape. At least a portion 200 of the bulbous base 190 has a diameter which is of a length that is greater than that of the retaining groove 192. Referring now to FIGS. 5 and 5A, an area between the bulbous base 190 and the shuttle 166 defines a shuttle cavity 202. The shuttle cavity 202 is shaped to increase a drag force applied to the shuttle assembly 88 by a fluid flowing adjacent thereto.

The retaining groove 192 is defined by the area between the sealing surface 154 and the bulbous base 190. The plug member 156 is attached to the shuttle 166 by engaging the main portion 170 and the retaining groove 192. To assembly the shuttle assembly 88 and engage the main portion 170 and the retaining groove 192, the bulbous base 190 is compressed and directed through the aperture 168 and the main portion 170 is aligned with the retaining groove 192.

As illustrated best in FIGS. 5 and 5A, the biasing member 86 is disposed between the base portion 82 and the cap portion 56 adjacent the cap perforation 74. The biasing member 86 contacts the shuttle assembly 88 and applies a force thereto. Preferably, the biasing member 86 applies the force to the shuttle assembly 88 via contact with the plurality of shuttle supports 172.

Figure 4:
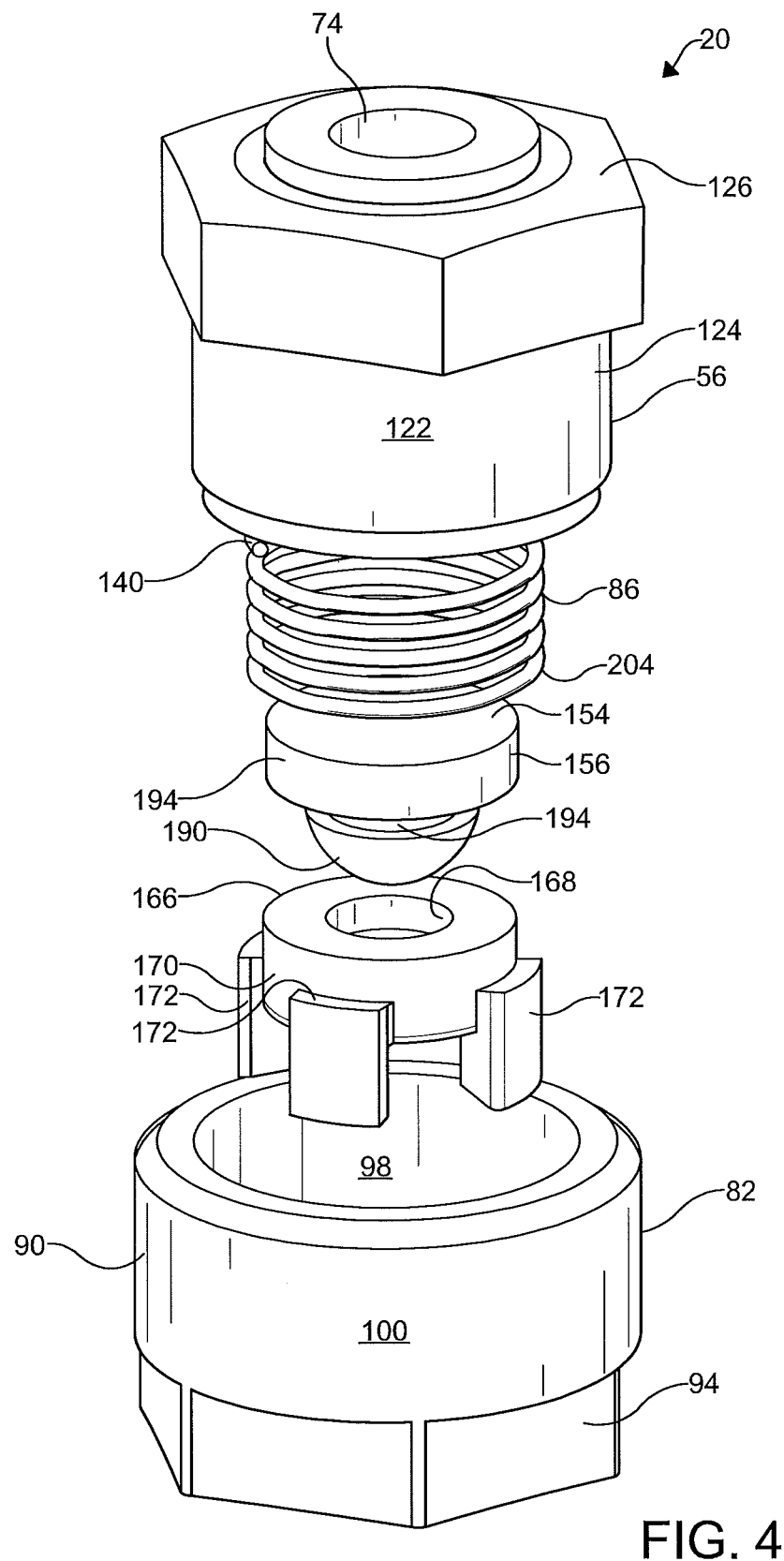
FIG. 4 depicts an exploded view of the valve assembly of FIG. 3.

As shown in FIG. 4, the biasing member 86 is preferably a compression spring such as, for example, a coil spring formed from a spring steel. However, it should be appreciated that the biasing member 86 may be of another kind, type, make and/or formed from another material. The biasing member 86 is pretensioned. To open the valve assembly 20, the biasing member 86 biases the shuttle 166 towards the lower wall portion 92. As shown in FIGS. 5 and 5A, a first member end 204 of the biasing member 86 abuts each of the shuttle supports 172 and the second member end 140 abuts the cap portion 56.

In an embodiment, the valve assembly 20 also comprises the filter 120. The filter 120 is utilized to prevent dirt and/or debris in the wheel 36 from entering the valve assembly 20. The filter 120 may be conventional in the art. Preferably, the filter 120 is attached to the base portion 82 by a portion 206 thereof being disposed in the groove 118 formed in the stem portion 94.

As aforementioned, the valve assembly 20 may be in the closed position or the open position. In the open position, the fluid passage 180 is provided through the valve assembly 20. The fluid passage 180 comprises the cap perforation 74, base perforation 102, space 196 between the ridge 152 and the shuttle assembly 88, space 208 between the shuttle assembly 88 and the cap portion 56, and one or more of the spaces 210 between the shuttle supports 172.

Figure 6:
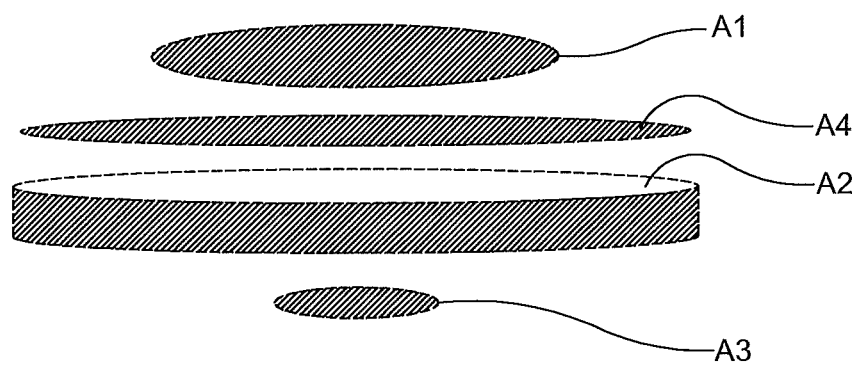
FIG. 6 depicts a perspective view of certain areas within the valve assembly of FIG. 3.

When a pressure differential between the pressure within the inflation system conduit 62, 62A and the pressure within the wheel 36 is above an opening threshold, the valve assembly 20 is in or placed in the open position. Referring now to FIGS. 5 and 6, a relationship between an area A4 (hereinafter referred to as the fourth area) of the sealing surface 154 bounded by the ridge 152 when the valve assembly 20 is in the closed position, the spring rate of the biasing member 86, and the pressure differential between the pressure within the inflation system conduit 62, 62A and the pressure within the wheel 36 determines the opening threshold and facilitates placing the valve assembly 20 in the open position. Preferably, the opening threshold is about 5 psi or more. More preferably, the opening threshold is about 5 to about 8 psi. The valve assembly 20 may be configured to have a specific opening threshold. The valve assembly 20 remains in the open position so long as the pressure differential between the pressure within the inflation system conduit 62, 62A and the pressure within the wheel 36 is above the opening threshold. In the open position, the plug member 156 does not contact the cap portion 56, allowing a flow of the pressurized fluid from the base perforation 102 to the cap perforation 74 through the fluid passage 180 or allowing a flow of the pressurized fluid from the cap perforation 74 to the base perforation 102 through the fluid passage 180.

When a pressure differential between the pressure within the wheel 36 and the pressure within the inflation system conduit 62, 62A is above a closing threshold, the valve assembly 20 is in or placed in the closed position. Preferably, the closing threshold is about 5 to about 8 psi. The valve assembly 20 may be configured to be at a specific closing threshold. In the closed position, the plug member 156 sealingly contacts with the cap portion 56, preventing a flow of the pressurized fluid from the cap perforation 74 to the base perforation 102 or vice versa. The valve assembly 20 remains in the closed position until the tire inflation system determines that the pressure within the wheel 36 needs to be adjusted.

Referring now to FIGS. 5a and 6, a relationship between an area A1 (hereinafter referred to as the first area) of the cap perforation 74, an area A2 (hereinafter referred to as the second area) between the sealing surface 154 and the ridge 152 when the valve assembly 20 is in the open position which corresponds to an area of a side of a right cylinder and an area A3 (hereinafter referred to as the third area) of the reduced diameter of the base perforation 102 determines the closing threshold and facilitates placing the valve assembly 20 in the closed position. The first area A1 must be greater than the second area A2, and the third area A3 must be greater than the second area A2 to obtain the closing threshold that is desirable for use with the tire inflation system. Preferably, the third area A3 is about 1.1 times greater than the second area A2 and the first area A1 is about 3.8 times greater than the second area A2. Such a selection of the areas A1, A2, and A3 results in the closing threshold of about 5 to about 8 psi. As above-discussed, when the valve assembly 20 is in the open position, one or more spaces 210 between the shuttle supports 172 forms a portion of the fluid passage 180. A total cross sectional area of the spaces between supports 172 is about equal to the first area A1. Also, as illustrated in FIG. 6, the fourth area A4 is larger than the first area A1.

Advantageously, the valve assembly 20 hereinabove described can operate in an efficient manner at a wider range of pressures than the known designs. For example, the valve assembly 20 can operate at fluid supply and/or wheel pressures of about 5 psi to 180 psi. Further, the valve assembly 20 does not suffer from diminished performance under certain ambient temperature conditions which is observed in the known designs. For example, placing the valve assembly 20 in the open or closed position is not affected by low temperature conditions. Additionally, when inflating or deflating a wheel 36 is complete, the valve assembly 20 can be placed in the closed position quickly to provide a desired pressure within the wheel 36.

A method of inflating or deflating a wheel is also described herein. It should be appreciated that the term "inflating" refers to increasing the pressure of the fluid in the wheel and the term "deflating" refers to decreasing the pressure of the fluid in the wheel. The method may be utilized to inflate or deflate the wheel to a selected pressure. The pressure of the fluid in the wheel may be selected by, for example, an operator and be from about 5 to 180 psi.

The method of inflating or deflating the wheel comprises providing a valve assembly 20. Preferably, the valve assembly 20 is as above-described. Preferably, the valve assembly 20 comprises the cap portion 56, base portion 82, biasing member 86 and shuttle assembly 88 which are as above-described.

In an embodiment, the wheel is provided and is in fluid communication with the valve assembly 20 via the base perforation 102. Preferably, the wheel 36 is as above-described. The inflation system conduit 62, 62A is provided in fluid communication with the valve assembly 20 via the cap perforation 74. Preferably, the inflation system conduit 62, 62A is as above-described.

When it is desired to inflate or deflate the wheel 36, the valve assembly 20 is placed in the open position. When it is desired to terminate inflating or deflating the wheel 36, the valve assembly 20 is placed in the closed position.

When the valve assembly 20 is placed in the open position, a force applied to the shuttle assembly 88 by the pressurized fluid from the inflation system conduit 62, 62A through the cap perforation 74, the drag force applied to the shuttle assembly 88, and the force applied by the biasing member 86 to the shuttle assembly 88 urges the shuttle assembly 88 towards the lower wall portion 92, causing the sealing surface 154 to no longer sealingly contact the ridge 152, forms the space 196 there between, and causes each of the shuttle supports 172 to abut the lower wall portion 92. The force applied by the biasing member 86 to the shuttle assembly 88 and from the inflation system conduit 62, 62A through the cap perforation 74 by the pressurized fluid from the cap perforation 74 to the fourth area A4 places the valve assembly 20 in the open position and is greater than the force applied by the pressurized fluid from the wheel 36 to the shuttle assembly 88 through the base perforation 102. A spring rate or another characteristic of the biasing member 86 may be adjusted to facilitate placing the valve assembly 20 in the open position when the pressurized fluid from the inflation system conduit 62, 62A is a predetermined amount greater than the pressurized fluid within the wheel 36.

The configuration of the base perforation 102, the cap perforation 74, the ridge 152, and the shuttle assembly 88 may also facilitate placing the valve assembly 20 in the open position. The base perforation 102, the cap perforation 74, and the ridge 152 are shaped to militate against pressure losses that occur as a fluid flows through an orifice constriction. The outer edge of the main portion, the upper edges of the shuttle supports, and the shuttle cavity are shaped to increase a drag force applied to the shuttle assembly by a fluid flowing adjacent thereto. When the fluid flows from the cap perforation 74 to the base perforation 102, the fluid applies the drag force to the shuttle assembly 88. The greater the pressure within the inflation system conduit 62, 62A is when compared to the pressure within the wheel 36, the greater the drag force which is applied to the shuttle assembly 88.

When the valve assembly 20 is placed in the closed position, a force applied to the shuttle assembly 88 by the pressurized fluid from the wheel 36 through the base perforation 102 and the drag force applied to the shuttle assembly 88 urges the shuttle assembly 88 towards the cap portion 56, causing the sealing surface 154 to sealingly contact the ridge 152. The force applied to the shuttle assembly 88 to place the valve assembly 20 into the closed position is greater than a sum of a force applied by the biasing member 86 to the shuttle assembly 88 and the force applied by the pressurized fluid from the cap perforation 74. Further, the spring rate or other characteristic of the biasing member 86 may be adjusted to facilitate placing the valve assembly 20 in the closed position when the pressurized fluid from the base perforation is a predetermined amount greater than the pressurized fluid from the cap perforation 74.

The configuration of the cap perforation 74, shuttle assembly 88, base perforation 102, and the ridge 152 also facilitate placing the valve assembly in the closed position. The cap perforation 74, base perforation 102 and the ridge 152 are shaped to militate against pressure losses that occur as a fluid flows through an orifice constriction. The outer edge of the main portion, the upper edges of the shuttle supports, and the shuttle cavity are shaped to increase a drag force applied to the shuttle assembly by a fluid flowing adjacent thereto. When the fluid flows from the base perforation 102 to the cap perforation 74, the fluid applies the drag force to the shuttle assembly 88. The greater the pressure within the wheel 36 when compared to the pressure within the inflation system conduit 62, 62A, the greater the drag force is which is applied to the shuttle assembly 88.

When the valve assembly 20 is in the open position, the inflation system conduit 62, 62A is in fluid communication with the wheel 36 via the valve assembly 20. Fluid in the inflation system conduit 62, 62A may be at a pressure which is greater or less than the pressure of the fluid in the wheel 36. When it is desired to inflate the wheel 36, the fluid in the inflation system conduit 62, 62A is at a pressure which is greater than the pressure that the fluid is at in the wheel 36. When it is desired to deflate the wheel 36, the fluid in the wheel is at a pressure which is greater than the pressure that the fluid is at in the inflation system conduit 62, 62A.

Fluid is directed through the valve assembly 20 via the cap perforation 74, about the shuttle assembly 88 and via the base perforation 102. The method may comprise selectively providing the fluid at a first pressure and a second pressure within the valve assembly 20. When it is desired to place the valve assembly 20 in the open position, the first pressure is preferably greater than the second pressure of the fluid. In an embodiment, the first pressure is greater than the second pressure when the pressure of the fluid in the inflation system conduit 62, 62A is at a pressure which is greater than the pressure of the fluid in the wheel 36. When it is desired to place the valve assembly 20 in the closed position, the second pressure is preferably greater than the first pressure. In an embodiment, the second pressure is greater than the first pressure when the pressure of the fluid in the wheel 36 is at a pressure which is greater than the pressure of the fluid in the inflation system conduit 62, 62A. When the pressure of the fluid in the wheel 36 is greater than the pressure of the fluid in the inflation system conduit 62, 62A by 5 psi or more, the second pressure is greater than the first pressure such that the valve assembly 20 is placed in the closed position.

Portions of the valve assembly 20 can be selected to selectively provide the first pressure or second pressure of the fluid in predetermined positions within the valve assembly 20. In this embodiment, the first pressure and second pressure of the fluid are exerted on separate surfaces of the shuttle assembly 88. Preferably, the cap portion 56, base portion 82, and shuttle assembly 88 are structured to selectively provide the first pressure between the cap portion 56 and shuttle assembly 88 and provide the second pressure between the base portion 82 and shuttle assembly 88. In an embodiment, the method comprises selecting the first area A1 to be greater than the second area A2 and the third area A3 to be greater than the second area A2. In this embodiment, the first area A1 is defined by a space in the cap perforation 74, the second area A2 is defined by a space provided between the shuttle assembly 88 and the cap portion 56, and the third area A3 is defined by a space in the base perforation 102. Selecting the first area A1, the second area A2 and the third area A3 as described above allows the first pressure to be selectively provided between the cap portion 84 and shuttle assembly 88 and the second pressure to be selectively provided between the base portion 82 and shuttle assembly 88.

The method also comprises urging the shuttle assembly 88 toward the cap portion 56 or base portion 82 so as to place the valve assembly 20 in the open or closed position.

When it is desired to place the valve assembly 20 in the open position to inflate or deflate the wheel, the shuttle assembly 88 is urged toward the base portion 82 by forces applied by the biasing member 86 and the first pressure of the fluid. Preferably, the first pressure is greater than the second pressure of the fluid. Also, in these embodiments, the sum of the forces applied to the shuttle assembly 88 by the first pressure of the fluid and the biasing member 86 are greater than that of the sum of the forces applied on the shuttle assembly 88 by the second pressure of the fluid. As the shuttle assembly 88 is urged toward the base portion 82, the biasing member 86 which is positioned between the cap portion 56 and shuttle assembly 88 extends toward the base portion 82. The biasing member 86 may extend until the shuttle supports 172 contact the base portion 82.

After the wheel 36 is inflated or deflated to the desired pressure, the valve assembly 20 is placed into the closed position by urging the shuttle assembly 88 toward the cap portion 56. In certain embodiments where it is desired to place the valve assembly 20 in the closed position, the second pressure is greater than the first pressure of the fluid. Also, in these embodiments, the force applied on the shuttle assembly 88 by the second pressure of the fluid is greater than the sum of the forces applied on the shuttle assembly 88 by the first pressure of the fluid and the force applied by the biasing member 86. As the shuttle assembly 88 is urged toward the cap portion 56, the biasing member 86 is compressed until the shuttle assembly 88 sealingly contacts the cap portion 56.

A method of placing the valve assembly in the closed position is also provided. The method may, in certain embodiments, incorporate embodiments of the above-described method of inflating or deflating the wheel and vice versa.

The method of placing the valve assembly in the closed position comprises providing the valve assembly 20. Preferably, the valve assembly 20 is as above-described. In certain embodiments, the valve assembly 20 is in the open position such that the inflation system conduit 62, 62A is in fluid communication with a wheel 36 via the valve assembly 20. The wheel 36 and inflation system conduit 62, 62A may be as above-described.

The method of placing the valve assembly in the closed position comprises providing the fluid in the valve assembly 20. The fluid is preferably at three or more discrete flow rates within the valve assembly 20. In an embodiment, the fluid is at first flow rate, a second flow rate and a third flow rate. Preferably, the first flow rate is greater than the second flow rate. Also, preferably, the third flow rate is greater than the second flow rate. In other embodiments, the third flow rate is greater than the first flow rate.

Preferably, the fluid is at the first flow rate in the cap portion 56, at the second flow rate adjacent the shuttle assembly 88 and at the third flow rate in the base portion 82. More preferably, the fluid in the cap perforation 74 is at the first flow rate, the fluid between the cap portion 56 and shuttle assembly 88 is at the second flow rate and the fluid in the base perforation 102 is at the third flow rate. The fluid in the cap perforation 74 is at the first flow rate as it passes through the first area A1, the fluid between the cap portion 56 and shuttle assembly 88 is at the second flow rate as it passes through the second area A2, and the fluid in the base perforation 104 is at the third flow rate as it passes through the third area A3.

Providing the fluid at the aforementioned flow rates in the aforementioned locations within the valve assembly 20 generates discrete fluid pressures within the valve assembly 20. Preferably, the fluid is at the first pressure between the cap portion 56 and shuttle assembly 88 and the second pressure between the base portion 82 and the shuttle assembly 88. The second pressure applies a force on the shuttle assembly 88 which is opposite the force applied on the shuttle assembly 88 by the biasing member 86 and the first pressure. In an embodiment, the force applied by the second pressure is greater than the sum of the other forces applied on the shuttle assembly 88 which enables the valve assembly 20 to close. In this embodiment, the second pressure may be greater than the first pressure by 5 psi or more.

To place the valve assembly 20 in the closed position, the shuttle assembly 88 is urged toward the cap portion 56 by the third pressure. When the plug member 156 sealingly contacts the ridge 152, the valve assembly 20 is closed. When the valve assembly 20 is closed, fluid communication between the inflation system conduit 62, 62A and the wheel 36 is prevented.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim is:
1. A valve assembly, comprising:
  a base portion;
  a cap portion attached to the base portion;
  a biasing member disposed between the base portion and the cap portion adjacent a perforation formed in the cap portion, wherein the perforation formed in the cap portion extends through a wall portion and increases in diameter to a ridge attached to the wall portion; and
  a shuttle assembly in contact with the biasing member, the shuttle assembly comprising a shuttle, a plug member attached to the shuttle, and a plurality of shuttle sup- ports, wherein the biasing member applies a force to the shuttle assembly via contact with the plurality of shuttle supports to open the valve assembly.

2. The valve assembly defined by claim 1, wherein the perforation formed in the cap portion comprises a space which defines an area of the perforation.

3. The valve assembly defined by claim 1, further comprising a fluid passage which comprises the perforation formed in the cap portion, a perforation formed in the base portion, a space between a ridge and the shuttle assembly, a space between a portion of the shuttle assembly and the cap portion, and one or more spaces between spaced apart shuttle supports.

4. The valve assembly defined by claim 1, wherein the force applied by the biasing member to the shuttle assembly biases the shuttle assembly toward the base portion and a fluid in a wheel, which is in communication with a perforation formed in the base portion, applies a force on the shuttle assembly which biases the shuttle assembly toward the cap portion.

5. The valve assembly defined by claim 1, wherein the shuttle comprises a plurality of shuttle supports which are equally spaced apart.

6. The valve assembly defined by claim 1, wherein the plug member is disposed adjacent the perforation formed in the cap portion.

7. The valve assembly defined by claim 1, wherein the plug member sealingly contacts the ridge.

8. The valve assembly defined by claim 1, wherein when the valve assembly is in an open position a space separates the plug member from the ridge.

9. The valve assembly defined by claim 1, wherein the base portion comprises a lower wall portion which defines a base perforation, the base perforation has a diameter that decreases from a first end of the perforation to a center portion of the perforation and increases from the center portion to a second end of the perforation.

10. The valve assembly defined by claim 1, wherein the perforation formed in the cap portion defines a first diameter and a perforation formed in the base portion defines a second diameter and wherein the first diameter is greater than the second diameter.

11. The valve assembly defined by claim 1, wherein the plug member is engaged with the shuttle.

12. The valve assembly defined by claim 1, wherein the plug member is in sealing contact with the ridge and a first area is defined by a surface of the plug member and the ridge, the first area is larger than a second area defined by a space positioned within the perforation formed in the cap portion, and the first area is of a circular shape.

13. The valve assembly defined by claim 1, wherein the wall portion defining the cap portion perforation comprises a rounded portion adjacent to the ridge, and the rounded portion comprises a fixed radius.

14. A wheel assembly comprising:
a tire;
a wheel rim attached to the tire to form a wheel; and
a valve assembly comprising:
  a base portion;
  a cap portion attached to the base portion;
  a biasing member disposed between the base portion and the cap portion adjacent a perforation formed in the cap portion, wherein the perforation formed in the cap portion extends through a wall portion and increases in diameter to a ridge attached to the wall portion; and
  a shuttle assembly in contact with the biasing member, the shuttle assembly comprising a shuttle, a plug member attached to the shuttle, and a plurality of shuttle supports, wherein the biasing member applies a force to the shuttle assembly via contact with the plurality of shuttle supports to open the valve assembly
the valve assembly positioned within the wheel, wherein the cap portion has an upper wall portion that is positioned between an outer surface of the wheel rim and an inner surface of the tire.

15. The wheel assembly defined by claim 14, wherein the valve assembly is attached to the wheel rim.

16. The wheel assembly defined by claim 15, wherein the valve assembly is attached to an outer surface of the wheel rim and a seal to prevent fluid from escaping from the wheel is provided therebetween.

17. The wheel assembly defined by claim 15, wherein the valve assembly is attached to an axially extending portion of the wheel rim.

18. The wheel assembly defined by claim 14, wherein the valve assembly base portion is separated from the tire by a space filled with a pressurized fluid.

19. The wheel assembly defined by claim 14, further comprising a fluid at a first pressure and a second pressure, wherein the fluid at the first pressure communicates with the valve assembly on a surface thereof and the fluid at the second pressure communicates with the valve assembly on an opposite surface thereof.

20. The wheel assembly defined by claim 14, further comprising a conduit which is in fluid communication with the valve assembly and extends radially through the wheel rim.

21. The wheel assembly defined by claim 14, wherein the valve assembly is in fluid communication with a pressurized fluid contained within the wheel on an end and a conduit via a mounting portion on an opposite end.

22. A method of inflating or deflating a wheel, comprising:
providing a valve assembly which comprises a shuttle assembly having a shuttle and a plug member attached to the shuttle, the shuttle assembly in contact with a biasing member that is disposed between a base portion and a cap portion, wherein the biasing member applies a force to the shuttle assembly via contact with a plurality of shuttle supports to open the valve assembly;
directing a fluid through the valve assembly via a perforation in the cap portion, wherein the perforation in the cap portion extends through a wall portion and increases in diameter to a ridge attached to the wall portion, about the shuttle assembly and biasing member and via a perforation in the base portion; and
urging the shuttle assembly toward the base portion or the cap portion so as to open or close the valve assembly.

23. The method defined by claim 22, further comprising selectively providing a first pressure and a second pressure of the fluid, wherein each pressure is exerted on a separate surface of the shuttle assembly.

24. The method defined by claim 23, wherein the first pressure is greater than the second pressure.

25. The method defined by claim 23, wherein the second pressure is greater than the first pressure.

26. The method defined by claim 23, wherein the base portion, shuttle assembly, and cap portion are structured to selectively provide the second pressure of the fluid between the shuttle assembly and the base portion.

27. The method defined by claim 22, further comprising providing a wheel in fluid communication with the valve assembly via the perforation in the base portion and a conduit in fluid communication with the valve assembly via the perforation in the cap portion.

28. The method defined by claim 22, further comprising compressing the biasing member so that the shuttle assembly sealingly contacts the cap portion so as to close the valve assembly.

29. The method defined by claim 22, wherein the shuttle assembly is urged toward the base portion by the biasing member and the first pressure of the fluid to open the valve assembly.

30. The method defined by claim 22, wherein a first area defined by a space in the perforation formed in the cap portion, a second area defined by a space between the shuttle assembly and the cap portion, and a third area defined by a space in the perforation formed in the base portion are selected so that the first area is greater than the second area and the third area is greater than the second area.

31. The method defined by claim 22, further comprising providing the fluid in the valve assembly at first flow rate in the perforation formed in the cap portion, at a second flow rate between the shuttle assembly and the cap portion and at a third flow rate in the perforation formed in the base portion and urging the shuttle assembly toward the cap portion so as to close the valve assembly.

32. The method defined by claim 31, wherein the third flow rate is greater than the first flow rate and second flow rate, respectively, and the first flow rate is greater than the second flow rate.

33. The method defined by claim 22, wherein the perforation in the base portion is defined by a lower wall portion and the base perforation has a diameter that decreases from a first end of the perforation to a center portion of the perforation and increases from the center portion to a second end of the perforation.

34. The method defined by claim 22, wherein the shuttle supports are equally spaced apart and the fluid is directed between the shuttle supports.

* * * * *

UNITED STATES PATENT AND TRADEMARK OFFICE
CERTIFICATE OF CORRECTION

Page 1 of 1

PATENT NO. : 9,573,428 B2
APPLICATION NO. : 14/392004
DATED : February 21, 2017
INVENTOR(S) : Jason M. Sidders and Lloyd G. Racine It is certified that error appears in the above-identified patent and that said Letters Patent is hereby corrected as shown below:

In the Claims

Column 15, Line 10: replace "a ridge" with --the ridge--

Signed and Sealed this
Third Day of July, 2018

Andrei Iancu
*Director of the United States Patent and Trademark Office*